United States Patent
Chung et al.

(10) Patent No.: US 7,302,544 B2
(45) Date of Patent: Nov. 27, 2007

(54) METHOD AND APPARATUS FOR ADAPTIVE GARBAGE COLLECTION

(75) Inventors: Seung-bum Chung, Seongnam-si (KR); Alexei Romanovski, Seongnam-si (KR); Woong-suk Cho, Seoul (KR); Duke-man Hur, Seoul (KR); Alexander Markov, Novosibirsk (RU); Vitaly Mikheev, Novosibirsk (RU)

(73) Assignee: Samsung Electronics Co., Ltd., Suwon (KR)

( * ) Notice: Subject to any disclaimer, the term of this patent is extended or adjusted under 35 U.S.C. 154(b) by 394 days.

(21) Appl. No.: 10/974,849

(22) Filed: Oct. 28, 2004

(65) Prior Publication Data

US 2005/0166028 A1   Jul. 28, 2005

(30) Foreign Application Priority Data

Jan. 28, 2004   (KR) .................. 10-2004-0005469

(51) Int. Cl.
G06F 12/02   (2006.01)

(52) U.S. Cl. ..................................... 711/173

(58) Field of Classification Search ................ 711/170, 711/173; 707/206
See application file for complete search history.

(56) References Cited

U.S. PATENT DOCUMENTS 6,286,016 B1 * 9/2001 Heller et al. ................ 707/206

FOREIGN PATENT DOCUMENTS

| JP | 60-252968 A | 12/1985 |
| JP | 3-189747 A | 8/1991 |
| JP | 06309220 A | 4/1994 |
| JP | 11312117 A | 9/1999 |
| JP | 2002-278828 A | 9/2002 |

* cited by examiner

Primary Examiner—Kevin L. Ellis
(74) Attorney, Agent, or Firm—Sughrue Mion, PLLC

(57) ABSTRACT

A method and apparatus for adaptive garbage collection in dynamic memory allocation. The method includes allocating a portion of a first memory space to a new object in response to a request from a predetermined process, copying objects used by the predetermined process among all objects occupying the first memory space to a second memory space, and adjusting the size of the first memory space and the size of the second memory space according to predetermined information.

8 Claims, 4 Drawing Sheets

METHOD AND APPARATUS FOR ADAPTIVE GARBAGE COLLECTION

CROSS-REFERENCE TO RELATED APPLICATION

This application claims priority from Korean Patent Application No. 10-2004-0005469 filed on Jan. 28, 2004 in the Korean Intellectual Property Office, the disclosure of which is incorporated herein in its entirety by reference.

BACKGROUND OF THE INVENTION

1. Field of the Invention

The present invention relates to garbage collection, and more particularly, to adaptive garbage collection using an adaptive asymmetric space structure in which the position of a space boundary changes in the structure of a semi-space copying collection algorithm.

2. Description of the Related Art

Garbage, in terms of programming, is data memory space that is determined as being occupied by an object no longer referenced by a program and then collected by an operating system. Garbage collection is a process of freeing such memory space so that the memory space can be efficiently recycled for other programs. In other words, garbage collection is a method for dynamically managing memory.

Conventionally, an operating system may forcibly terminate a program that fails to return memory space occupied by an object no longer referenced by the program when necessary, but usually, programmers need to clearly declare necessary memory space and make a program returning the memory space to the operating system when the memory space is no longer needed by the program.

When return of the no-longer needed memory space is neglected, the program may stop by unknown causes rather than by a logical bug. It is very difficult for programmers to chase down an elusive problem. Accordingly, garbage collection techniques of automatically finding memory space that is not used within a system and freeing the memory space have been developed.

Algorithms for garbage collection include a semi-space copying collection algorithm and a generational garbage collection algorithm. The following description concerns these two algorithms.

FIG. 1 illustrates a conventional semi-space copying collection algorithm.

As shown in FIG. 1, a memory area is divided into two areas of equal space, from-space and to-space. The from-space is a portion of the memory area allocated to an object, and the to-space is a portion of the memory area to which an object occupying the from-space is copied according to garbage collection. Here, the size of the to-space needs to be the same as that of the from-space because when all objects occupying the from-space are "alive", all of the objects need to be copied to the to-space during garbage collection. In addition, to perform the conventional semi-space copying collection algorithm, two copies of a single object are temporarily needed for pointer reversal. This is disclosed by Cheney ["A Nonrecursive List Compaction Algorithm," Communications of the ACM, 13(11), pp 677-678, 1970].

An object is an instance by which a particular class of a method or procedure of the particular class and a subclass having a data variable are implemented in object-oriented programming.

Objects are allocated to the from-space from a first stage to a third stage, as shown in FIG. 1. In the third stage, the from-space becomes full and is no longer allocated to an object. Accordingly, in a fourth stage, only "live" objects, other than objects no longer used, i.e., garbage, among the objects occupying the from-space, are copied to the to-space. As such, the previous from-space changes into to-space, and the previous to-space changes into from-space. Accordingly, in a fifth stage, objects are allocated to the from-space as in the first stage.

Usually, the semi-space copying collection algorithm is applied to another dynamic memory management algorithm, for example, a generational garbage collection algorithm, rather than be used independently.

FIG. 2 illustrates a conventional generational garbage collection algorithm.

The conventional generational garbage collection algorithm has been widely used since the 1980s. In the conventional generational garbage collection algorithm, a memory heap is divided into two or more generational spaces according to the age of an object. In FIG. 2, the memory heap is divided into a young generation area 200 and an old generation area 250. Since garbage collection is performed using a semi-space copying collection algorithm as shown in FIG. 1 in the young generation area 200, the young generation area 200 includes from-space 210 and to-space 220.

The age of an object is related to the number of copies generated of the object from one semi-space to another semi-space. Accordingly, when an object has been copied many times, the object may be regarded as being old.

Hereinafter, the conventional generational garbage collection algorithm will be described in detail.

Referring to FIG. 2, for garbage collection, a semi-space copying collection algorithm is used in the young generation area 200, and a mark-compact algorithm is used in the old generation area 250. A new object is allocated to the from-space 210, in the young generation area. Reference numerals 212, 214, 216, and 218 denote objects allocated to the from-space 210.

In the young generation area 200, garbage collection is performed by copying only live objects 212 and 216 from the from-space 210 to the to-space 220. The object 218 that has been "alive" while many garbage collections are performed in the young generation area 200 is defined as an old object and transferred to the old generation area 250.

When there is no space to which an object is transferred in the old generation area 250, garbage collection is performed in the old generation area 250 and usually takes longer than in the young generation area 200.

In the semi-space copying collection algorithm shown in FIG. 1, only one memory space between the two semi-spaces is used for object allocation. In other words, since garbage collection is performed when the memory space is full of objects, the semi-space copying collection algorithm has a problem in that the number of garbage collections increases as the size of the memory space decreases.

The generational garbage collection algorithm shown in FIG. 2 also has the above-described problem since the semi-space copying collection algorithm is usually used in the young generation area 200. In addition, the generational garbage collection algorithm has a problem in that the amount of floating garbage increases. The floating garbage indicates an object that is no longer used but still present in memory space, i.e., in the old generation area 250, because garbage collection has not yet been performed in the old generation area 250 since the object was transferred to the old generation area 250 by garbage collection performed in the young generation area 200. The more frequently garbage collection is performed, the more objects are transferred to the old generation area 250. As a result, the amount of floating garbage increases, degrading overall memory efficiency.

SUMMARY OF THE INVENTION

The present invention provides a more efficient method of collecting garbage by varying the size of the space necessary for a semi-space copying collection algorithm.

According to an aspect of the present invention, there is provided a garbage collection method regarding dynamic memory allocation. The garbage collection method comprises allocating a portion of first memory space to a new object in response to a request from a predetermined process, copying objects used by the predetermined process among all objects occupying the first memory space to second memory space, and adjusting the size of the first memory space and the size of the second memory space according to predetermined information.

Preferably, the predetermined information is history information generated during the allocating and copying steps.

The predetermined information is preferably a ratio between the size of the portion occupied by all of the objects in the first memory space and the size of the portion occupied by the objects copied from the first memory space to the second memory space.

According to another aspect of the present invention, there is provided an apparatus providing a garbage collection function regarding dynamic memory allocation. The apparatus comprises a first memory space to which a new object is allocated in response to a predetermined process; a second memory space to which objects used by the predetermined process among all objects occupying the first memory space are copied; and a garbage collection module which is activated by the process and which allocates space for storing objects in the first and second memory spaces, adjusts the size of the first memory space and the size of the second memory space according to predetermined information, passes on control authority to the predetermined process, and is then deactivated. Here, the predetermined process may be generated by a user application or a system application.

The predetermined information is preferably history information generated when a portion of first memory space is allocated to a new object in response to a request from a predetermined process and when objects used by the predetermined process among all objects occupying the first memory space are copied to second memory space.

Also, the predetermined information is preferably a ratio between the size of the portion occupied by all of the objects in the first memory space and the size of the portion occupied by the objects copied from the first memory space to the second memory space.

BRIEF DESCRIPTION OF THE DRAWINGS

The above features, as well as other features and advantages of the present invention, will become more apparent through a detailed description of the exemplary embodiments thereof, with reference to the attached drawings in which.

DETAILED DESCRIPTION OF THE INVENTION

Figure 1:
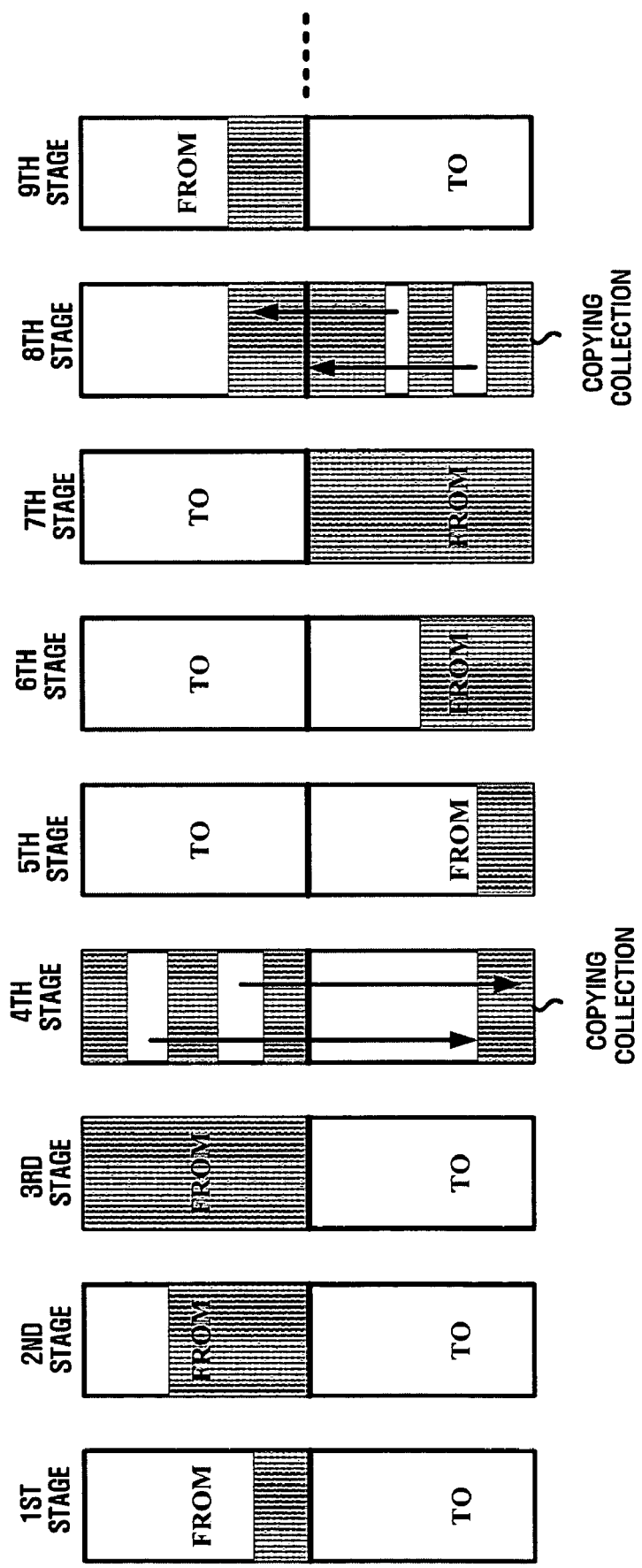
FIG. 1 illustrates a conventional semi-space copying collection algorithm.
Figure 2:
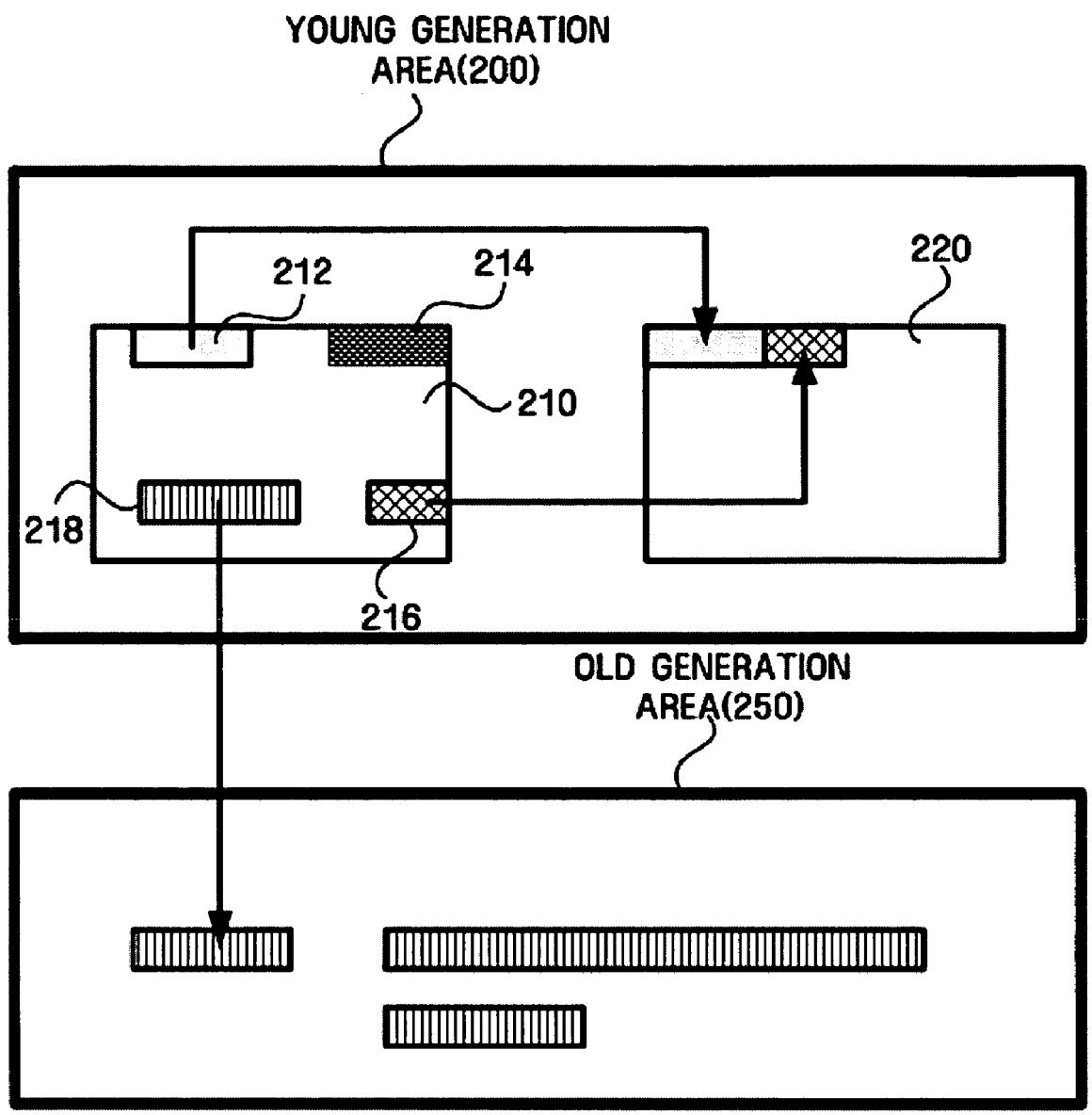
FIG. 2 illustrates a conventional generational garbage collection algorithm.

The invention will now be described more fully with reference to the accompanying drawings, in which exemplary embodiments of the invention are shown. This invention may, however, be embodied in many different forms and should not be construed as being limited to the embodiments set forth herein; rather, these embodiments are provided so that this disclosure will be thorough and complete, and will fully convey the concept of the invention to those skilled in the art. The spirit and scope of the invention is defined by the appended claims. In the drawings, the same reference numerals denote the same element.

Hereinafter, preferred embodiments of the present invention will be described in detail with reference to the attached drawings.

Figure 3:
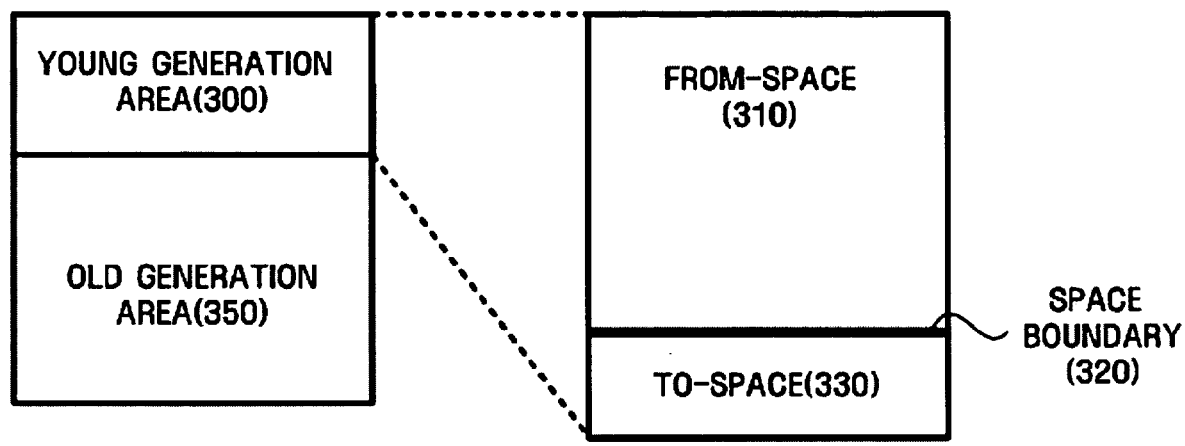
FIG. 3 illustrates a memory structure used in a method for adaptive generational garbage collection according to an embodiment of the present invention.

FIG. 3 illustrates a memory structure used in a method for adaptive generational garbage collection according to an embodiment of the present invention.

As shown in FIG. 3, a memory area such as a heap is divided into a young generation area 300 and an old generation area 350 for garbage collection. The young generation area 300 is divided into from-space 310 and to-space 330 using a space boundary 320. The space boundary 320 is not fixed to define two equal sized spaces, but is moved freely.

Figure 4:
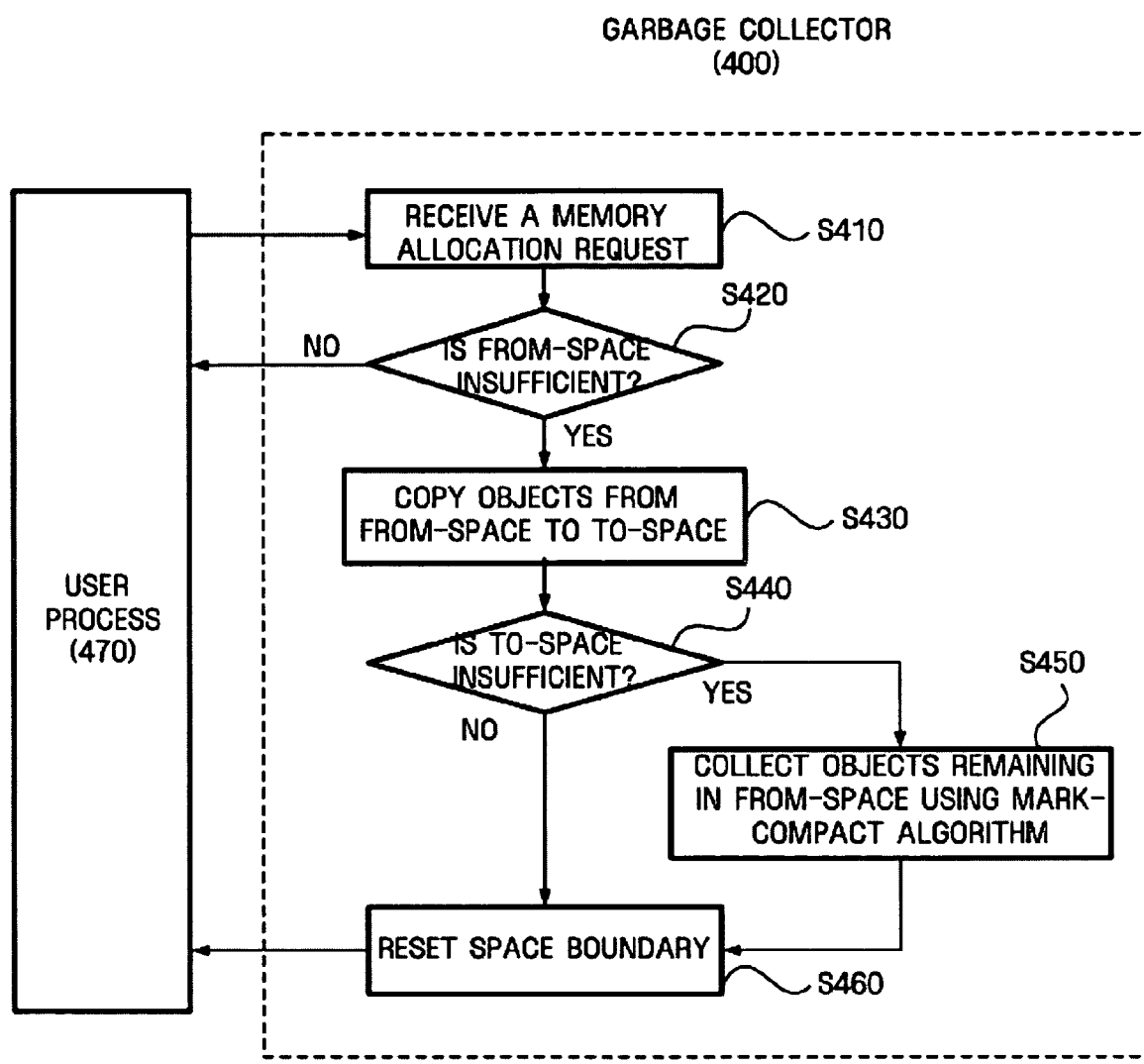
FIG. 4 is a flowchart of a method of performing garbage collection in a young generation according to an embodiment of the present invention.

FIG. 4 is a flowchart of a method of performing garbage collection in a young generation according to an embodiment of the present invention. A garbage collector 400 performing garbage collection is a processor operating within a system. The garbage collector 400 performs a garbage collection function through interaction with a user process 470. In other words, the garbage collector 400 is an independent module which allocates memory upon receiving a memory allocation request from the user process 470 and secures memory margin by removing garbage from a memory heap that is managed by the garbage collector 400 when memory is insufficient. In addition, since the garbage collector 400 automatically allocates and frees memory, it can be connected to any type of processor and used as a memory manager. In particular, the garbage collector 400 may be applied to virtual machines including Java.

The garbage collector 400 starts operation upon receiving a memory allocation request for a new object from the user process 470 in step S410. Next, the garbage collector 400 checks whether from-space is sufficient to allocate new memory space to the new object in step S420. When the from-space is sufficient for the new object, the garbage collector 400 allocates a portion of the from-space corresponding to the size of the new object to the user process 470 and passes on control authority to the user process 470.

However, when the from-space is insufficient for the new object in step S420, garbage collection is performed in a young generation in step S430. When to-space is insufficient to copy all objects existing in the from-space in step S440, objects remaining in the from-space are collected by performing a well-known mark-compact algorithm in the from-space in step S450.

After completing the garbage collection normally, the garbage collector 400 resets the space boundary between the from-space and the to-space in step S460. Here, the garbage collector 400 resets the space boundary using a predetermined estimated value.

Hereinafter, a method of resetting the space boundary will be described in detail.

Conventionally, the size of from-space is equal to that of to-space. However, in the present invention, the space boundary between the from-space and the to-space is calculated adaptively. Usually, most objects allocated to the from-space are classified as garbage and removed, and only a few objects are copied from the from-space to the to-space. Accordingly, the space boundary is reset such that the from-space is much greater than the to-space whenever garbage collection ends.

The following description concerns the method of calculating the space boundary. When garbage collection is performed in the young generation, a ratio between the total memory allocated to all objects before the garbage collection and a total memory allocated to live objects after the garbage collection is represented by R, and the ratio R measured with respect to an i-th garbage collection is represented by R(i). When it is assumed that ratios R(i) have a stable probability distribution, an average of ratios with respect to up-to-date "k" garbage collections can be expressed by:

$$avg=(R(i)+R(i-1)+\ldots +R(i-k+1))/k.$$

The ratio R with respect to the next garbage collection can be estimated using linear approximation to the average of ratios with respect to the up-to-date "k" garbage collections.

Here, linear divergence is defined by the difference between each of the ratios R(i) and the average of the ratios R(i) and is separately stored as an item of garbage collection history.

The linear divergence is expressed by:

$$div(i)=|R(i)-avg|.$$

In an embodiment of the present invention, to prevent rapid movement of the space boundary between the from-space and the to-space and to stabilize a memory profile, it is verified whether values of div(i) with respect to the up-to-date "k" garbage collections are all within a maximum limit MAX_D. When it is verified that all of the values of div(i) are within the limit MAX_D, the divergence "div" for resetting the space boundary is defined as having at least a minimum value MIN_D so that noise fluctuation, that may occur according to the probability distribution, can be absorbed. Accordingly, the divergence "div" is expressed by:

$$div=max(div, MIN\_D).$$

Finally, only when the divergence "div" is less than the maximum limit MAX_D, the space boundary is defined by:

$$R^*=max(avg, R(i))+div.$$

In the present invention, the space boundary between the from-space and the to-space is varied using such an estimated value.

FIG. 3 illustrates garbage collection in the young generation area 300. Processes with respect to the old generation area 350, such as a process of transferring objects that have aged over many garbage collections performed in the young generation area 300 to the old generation area 350, a process of performing garbage collection in the old generation area 350, and a processing of updating memory references between the young and old generations 300 and 350, may be performed using a conventional generational garbage collection algorithm. A typical generational garbage collection algorithm is disclosed by Jones and Lins ["Garbage Collection: Algorithms for Automatic Dynamic Memory Management", pp. 1-41, Wiley, 1996].

To compare the performance of an adaptive garbage collector according to an embodiment of the present invention with the performance of a conventional garbage collector, J2 Micro Edition Connected Device Configuration Reference Implementation (hereinafter, referred to as J2ME CDC RI) provided as a standard by Sun Microsystems was used as a test bed.

Garbage collection algorithms such as a mark-sweep algorithm, a copying semi-space algorithm, and a generational algorithm can be performed in the J2ME CDC RI. Among the three algorithms, the generational algorithm, i.e., a generational garbage collection algorithm (hereinafter, referred to as an RI GC), having the highest performance was compared with an algorithm according to an embodiment of the present invention (hereinafter, referred to as a new GC).

In addition, the performance of the two algorithms was measured in a test using the SPECjvm98 benchmark widely used to measure performance of Java virtual machines. In the test, a reference personal computer (PC) used Linux RedHat 8.0 as an operating system and had hardware system specifications: Pentium II 233 MHz and 32MB RAM. Such PC specifications were used because the present invention is useful for an embedded system in which memory resource management is very important. Table 1 shows the results of comparing the performance of conventional garbage collection with the performance of garbage collection according to an embodiment of the present invention with respect to the SPECjvm98 benchmark.

TABLE 1

| Benchmark | Memory | Total GC pause time | | | Maximum GC pause time | |
| --- | --- | --- | --- | --- | --- | --- |
| | | RI GC | New GC | RI/new (%) | RI GC | New GC |
| _209_db | 12M | 16383.99 | 1988.66 | 823.86 | 424.64 | 115.49 |
| _228_jack | 2M | 8293.63 | 2531.38 | 327.63 | 45.02 | 65.32 |
| _213_javac | 12M | 39979.46 | 15461.86 | 258.56 | 1390.39 | 884.91 |
| _202_jess | 3M | 1561.63 | 614.61 | 254.08 | 27.79 | 12.88 |
| _227_mtrt | 10M | 1494.93 | 723.18 | 206.71 | 82.36 | 46.39 |

In Table 1, "memory" indicates a memory size used for a benchmark. The total GC collection time is read in milliseconds and is an accumulation of times during which the user process paused while garbage collection was being performed. As the total GC collection time decreases, the performance increases.

As shown in Table 1, when the adaptive garbage collection according to an embodiment of the present invention was used, time used to perform garbage collection on the Java virtual machine was remarkably decreased, and the maximum GC pause time was also decreased.

Having thus described certain embodiments of the present invention, various alterations, modifications and improvements will be apparent to those of ordinary skill in the art without departing from the spirit and scope of the present invention. Accordingly, the foregoing description and the accompanying drawings are not intended to be limiting.

Unlike conventional garbage collection in which only half of a young generation can be used for memory allocation, the present invention allows more than half of a young generation, and preferably, most of the young generation to be used for memory allocation, thereby increasing memory usage efficiency.

In addition, since the present invention provides a-greater area for memory allocation, the number of garbage collections per unit time decreases, and therefore, the amount of floating garbage decreases. As a result, memory usage efficiency increases.

Due to an increase in memory usage efficiency, total garbage collection time, a most important performance index of a garbage collector, decreases, as compared to a conventional generational garbage collector.

What is claimed is:

1. A garbage collection method in dynamic memory allocation, comprising:
    (a) allocating a portion of first memory space to a new object in response to a request from a predetermined process;
    (b) copying objects used by the predetermined process among all objects occupying the first memory space to second memory space; and
    (c) adjusting the size of the first memory space and the size of the second memory space according to predetermined information,
    wherein the predetermined information is a ratio between the size of the portion occupied by all of the objects in the first memory space and the size of the portion occupied by the objects copied from the first memory space to the second memory space.

2. The garbage collection method of claim 1, wherein the predetermined process is generated by a user application.

3. The garbage collection method of claim 1, wherein the predetermined process is generated by a system application.

4. The garbage collection method of claim 1, wherein the predetermined information is history information generated during steps (a) and (b).

5. An apparatus providing a garbage collection function in dynamic memory allocation, the apparatus comprising:
    first memory space which is allocated to a new object in response to a predetermined process;
    second memory space which is allocated to objects used by the predetermined process among all objects occupying the first memory space are copied; and
    a garbage collection module which is activated by the process, allocates space for storing objects in the first and second memory spaces, adjusts the size of the first memory space and the size of the second memory space according to predetermined information, passes on control authority to the predetermined process, and is deactivated,
    wherein the predetermined information is a ratio between the size of the portion occupied by all of the objects in the first memory space and the size of the portion occupied by the objects copied from the first memory space to the second memory space.

6. The apparatus of claim 5, wherein the predetermined process is a process generated by a user application.

7. The apparatus of claim 5, wherein the predetermined process is a process generated by a system application.

8. The apparatus of claim 5, wherein the predetermined information is history information generated when a portion of first memory space is allocated to a new object in response to a request from a predetermined process and when objects used by the predetermined process among all objects occupying the first memory space are coped to second memory space.

* * * * *